United States Patent [19]
Fujikawa

[11] Patent Number: 5,213,304
[45] Date of Patent: May 25, 1993

[54] VALVE

[75] Inventor: Toshihiro Fujikawa, Higashikurume, Japan

[73] Assignee: Fuji Engineering Co., Ltd, Tokyo, Japan

[21] Appl. No.: 939,152

[22] Filed: Sep. 2, 1992

[30] Foreign Application Priority Data

Mar. 16, 1992 [JP] Japan .................................. 4-90222

[51] Int. Cl.⁵ .............................................. F16K 31/12
[52] U.S. Cl. ............................................ 251/36; 251/33
[58] Field of Search ......................... 251/33, 36, 50, 51

[56] References Cited

U.S. PATENT DOCUMENTS

| | | | |
|---|---|---|---|
| 1,598,166 | 8/1926 | Stewart | 251/36 |
| 2,521,264 | 9/1950 | Stark | 251/33 |
| 3,241,567 | 3/1966 | Pusch et al. | 251/36 |

FOREIGN PATENT DOCUMENTS

| | | | |
|---|---|---|---|
| 497639 | 12/1919 | France | 251/33 |
| 228178 | 10/1966 | Japan . | |

Primary Examiner—A. Michael Chambers
Attorney, Agent, or Firm—Price, Heneveld, Cooper, DeWitt & Litton

[57] ABSTRACT

A buffered valve having a longitudinal passage leading to a valve chamber. The valve chamber is divided by a spacer into a front and rear chamber which are connected by a port in the spacer. A normally closed main valve member is in the front chamber which blocks the longitudinal passage. A sub-valve which has a vessel or cup-like configuration is in the rear valve chamber and is biased toward the port in the spacer by a coil spring. The sub-valve has a through hole which is blocked by a check valve. Adjustable passages are provided for connecting between the front and rear chambers of the valve. When the main valve opens, the flow of fluid from behind the main valve member to the rear chamber is restricted by the port in the spacer and the sub-valve assembly to provide a buffered valve action. When the main valve is closing, the flow of fluid is again restricted by the passage in the sub-valve and the port in the spacer to provide a buffered action. The main valve member has an attached buffer member which substantially interferes with the flow of fluid through the longitudinal passage increasing the buffering action.

4 Claims, 2 Drawing Sheets

VALVE

BACKGROUND OF THE INVENTION

1. Field of the Invention

This invention relates to a valve for use in various types of hydraulic apparatus.

2. Description of the Related Art

The inventor of the present invention has filed an application for patent on a novel valve, which has been disclosed in Japanese Patent Laid-Open No. 61-228178 and Japanese Patent Publication No. 3-61870.

The valve according to the above-mentioned disclosed invention has a feature that the valve body can be easily opened and closed with a small force with respect to a liquid at a relatively high pressure, and that a speed reduction is effected when the valve body is opened and closed so as to protect the valve seat, etc. from impact, thereby providing the valve with a long service life.

However, the valve of the above-mentioned disclosed invention still has a problem that the buffer effect when the valve body is opened and closed is not adequate, thereby making it impossible to obtain a sufficiently long service life for the valve. Further, due to this inadequate buffer effect, it is impossible to open and close the valve at a minimum speed so as to enable the associated hydraulic apparatus to perform a minimum-speed starting. Nowadays, such a minimum-speed starting or stopping is a requirement for various types of hydraulic apparatus.

The present invention has been made with a view to solving the problems mentioned above. It is accordingly an object of the present invention to provide a valve which is capable of exerting a sufficient buffer effect when the valve body is opened and closed so as to enable it to be opened and closed at a minimum speed, thereby enabling various types of apparatus to which this valve is applied to perform a minimum starting and stopping.

SUMMARY OF THE INVENTION

In accordance with the present invention, the above object can be achieved by a valve comprising: a valve chamber 3 formed in a main body 1 and having a valve seat 2; a spacer 5 having an orifice 4 and provided in such a way as to intersect the valve chamber 3 in the longitudinal dimension thereof; front and rear chamber 6 and 7 respectively formed by the spacer 5 in the section of the valve chamber 3 on the side of the valve seat 2 and the section thereof on the opposite side; a main valve 9 arranged in the front chamber 6 and constantly biased toward the valve seat 2 by a first spring 8; a substantially vessel-like sub-valve 11 arranged in the rear chamber 7 and constantly biased toward the spacer 5 by a second spring 10; a through-hole 13 formed in the sub-valve 11 and having a check valve 12; an end chamber 14 defined between the main valve 9 and the valve seat 2; a side hole 16 extending through a side wall 15 of the valve chamber 3 formed in the main body 1 so as to lead to the end chamber 14; an axial hole 18 extending through a front axial end wall 17 of the valve chamber 3 formed in the main body 1 so as to lead to the end chamber 14; a drain passage 20 formed in the main body 1, having an opening/closing valve 19 and allowing the rear chamber 7 to communicate with an oil tank; a communication passage 21 formed in the main body 1 and leading to the rear chamber 7; a first passage 23 allowing the communication passage 21 and the side hole 16 to communicate with each other and having a second check valve 22; and a second passage 25 allowing the communication passage 21 and the axial hole 18 to communicate with each other and having a third check valve 24.

The above-described valve may be such that the first passage 23 has a first pressure-compensating reducing valve 26, and that the second passage 25 has a second pressure-compensating reducing valve 27.

Further, the above-described valve may be such that the drain passage 20 has an opening speed regulating valve 28, and that the communication passage 21 has a closing speed regulating valve 29.

Still further, the above-described valve may be such that the main valve 9 has a buffer member 30 which moves through the axial hole 18.

DESCRIPTION OF THE PREFERRED EMBODIMENT

Figure 1:
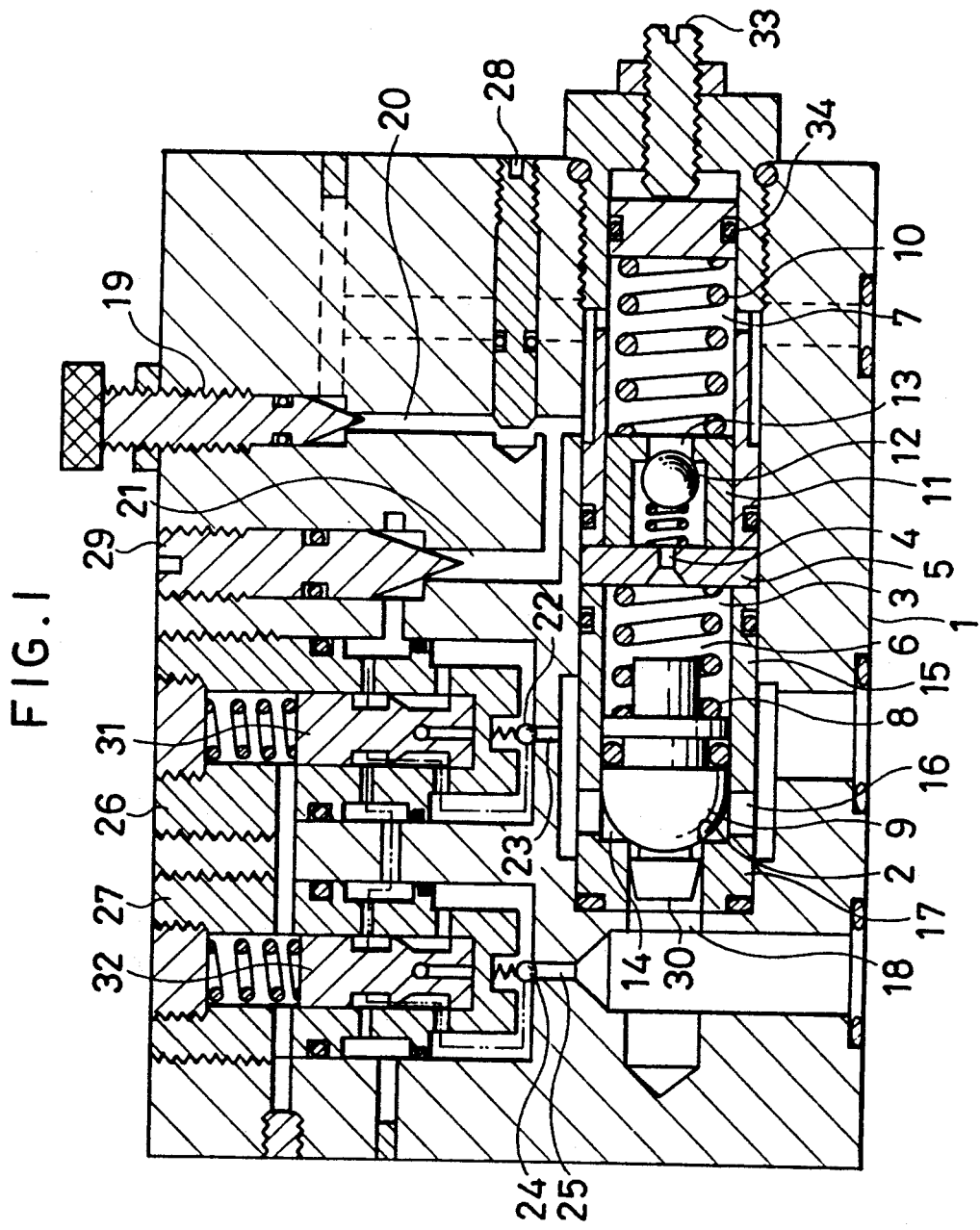
FIG. 1 is a sectional view of a valve according to an embodiment of this invention.
Figure 2:
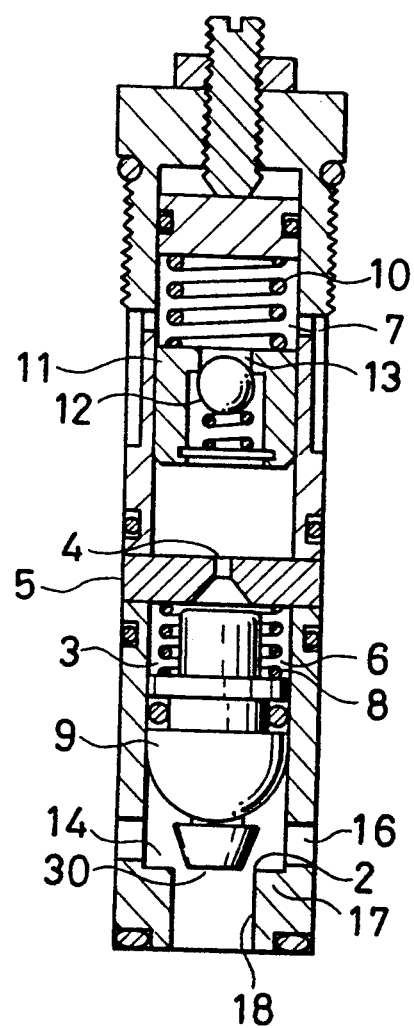
FIG. 2 is a diagram showing the essential parts of the valve of FIG. 1 in a state different from that of FIG. 1.

Referring to FIG. 1, numeral 1 indicates a main body, in which a valve chamber 3 having a valve seat 2 is formed. A fixed spacer 5 having an orifice 4 is formed in the middle of the valve chamber 3 in such a manner as to divide the valve chamber 3 lengthwise into a front chamber 6 on the side of the valve seat 2 and a rear chamber on the opposite side thereof.

The front chamber 6 contains a first spring 8 and a main valve 9 constantly biased toward the valve seat 2 by the first spring 8.

The rear chamber 7 has a sub-valve 11 constantly biased toward the spacer 5 by a second spring 10. The sub-valve 11 has a substantially vessel-like configuration and has a through-hole 13 equipped with a check valve 12.

Next, numeral 14 indicates an end chamber defined between the main valve 9 and the valve seat 2. Numeral 16 indicates a side hole formed in the main body 1 and extending through a side wall 15 of the valve chamber 3 so as to lead to the end chamber 14. Numeral 18 indicates an axial hole formed in the main body 1 and extending through an end wall 17 of the valve chamber 3 so as to lead to the end chamber 14. Numeral 19 indicates an opening/closing valve provided in a drain passage 20 allowing the rear chamber 7 to communicate with an oil tank (not shown). Numeral 21 indicates a communication passage formed in the main body 1 and leading to the rear chamber 7. The communication passage 21 and the side hole 16 communicate with each other through a first passage 23. Numeral 22 indicates a second check valve Numeral 25 indicates a second passage having a third check valve 24 and allowing the communication passage 21 and the axial hole 18 to communicate with each other.

Numeral 26 indicates a first pressure-compensating reducing valve, which is provided in the first passage 23 and which is capable of adjusting the pressure of a pressure oil or the like supplied from the axial hole 18 when there is any change in the pressure of the oil. Numeral 28 indicates an opening speed regulating valve provided in the drain passage 20 and capable of regulating the speed at which the main valve 9 is opened.

Numeral 29 indicates a closing speed regulating valve provided in the communication passage 21 and adapted to regulate the speed at which the main valve 9 is closed. Numeral 30 indicates a buffer member provided on the main valve 9 and adapted to move through the axial hole 18 when the main valve 9 is opened and closed. The movement of this buffer member entails resistance, which provides a buffer effect for the main valve 9.

Next, numerals 31 and 32 indicate first and second valves in the first and second pressure-compensating reducing valves 26 and 27, respectively.

Numeral 33 indicates an adjusting device for the spring 10, and numeral 34 indicates an O-ring.

The valve of this embodiment, constructed as described above, operates in the following manner.

Assuming that the main valve 9 is on the valve seat 2 and the fluid pressure of a pressure oil or the like is being applied to the side hole 16, opening the valve 19 causes the side hole 16, the front chamber 6, the drain passage 20, and the rear chamber 7 communicating with the drain passage 20 to communicate with an oil tank (not shown), with the result that the pressure in the rear chamber 7 becomes lower than that in the front chamber 6. As a result, the main valve 9 moves toward the rear chamber 7, i.e., rearwards, against the force of the first spring 8, so that the valve seat 2 is opened and the pressure oil or the like which has been stopped at the side hole 16 flows into the axial hole 18. In this process, the main valve 9 causes the liquid in the front chamber 6 to be forced into the sub-valve 11 through the orifice 4 of the spacer 5.

This causes the sub-valve 11 to move rearwards in the rear chamber 7 against the second spring 10. Accordingly, the movement of the main valve 9 does not take place abruptly but gently. That is, a buffer effect can be obtained. This buffer effect is mainly due to the resistance that the above-mentioned orifice offers to the passage of the liquid.

Next, if the opening/closing valve 19 is closed with the main valve 9 open, the pressure in the rear chamber 7 and that in the end chamber 14 are equalized, with the result that the sub-valve 11 is pressed forward, i.e., in the direction of the valve seat 2, by the second spring 10 and moves in that direction. In this process, the liquid in the sub-valve 11 flows through the orifice 4 of the spacer 5 and moves to the front chamber 6. This causes the main valve 9 to move in the direction of the valve seat 2 so as to close the same. In this process, however, the liquid in the sub-vale 11 cannot flow quickly through the orifice 4, so that the movement of the sub-valve 11 and, consequently, that of the main valve 9, takes place gently, thus realizing a buffer effect.

In this way, it is possible to effect an opening and closing at minimum speed.

Next, in the case of the type of valve provided with the first and second pressure-compensating reducing valves 26 and 27, the influence of any changes in the pressure of the pressure fluid supplied from the side hole 16 and the axial hole 18 is relatively small, thus making it possible to open and close the valve at minimum speed.

In the case of the type of valve which has the opening speed regulating valve 28 in the drain 20 and the closing speed regulating valve 29 in the communication passage 21, an opening/closing speed regulating effect is obtained in addition to the minimum-speed opening/closing effect.

In the case of the type in which the main valve 9 is equipped with the buffer member 30 adapted to move through the axial hole 18, the movement of the buffer member entails resistance, thereby making the opening/closing motion still gentler.

As described above, in accordance with the present invention, the spacer 5 having the orifice 4 is provided in the middle of the longitudinal dimension of the valve chamber 3 having the side hole 16 and the axial hole 18, and the front chamber 6 thereby defined contains the main valve 9, which is biased in the direction of the valve seat 2 by the first spring 8. The rear chamber 7 contains the sub-valve 11 having a substantially vessel-like configuration and biased in the direction of the spacer 5 by the second spring 10. The through-hole 13 having the check valve 12 is formed in the sub-valve 11, and the opening/closing valve 19 is provided in the drain passage 20 leading to the rear chamber 7. Due to this arrangement, a sufficient buffer effect is obtained for the opening and closing movements of the main valve 9, and the service life of the valve can be lengthened. Further, the above construction helps to protect various types of apparatus to which this valve is applied from impact and, at the same time, enable them to perform a minimum-speed starting and stopping.

Further, with the type of valve which has the opening speed regulating valve 28 and the closing speed regulating valve 29, it is possible not only to effect a minimum-speed opening and closing but also to control the speed of the opening and closing motions.

Still further, with the type of valve in which the main valve 9 has the buffer member 30, the buffer effect at the time of opening and closing can be further enhanced.

What is claimed is:

1. A valve comprising:
   a valve chamber 3 formed in a main body 1 and having a valve seat 2;
   a spacer 5 having an orifice 4 and provided in such a way as to intersect said valve chamber 3 in the longitudinal dimension thereof;
   front and rear chambers 6 and 7, respectively, formed by said spacer 5 in the section of said valve chamber 3 on the side of said valve seat 2 and the section thereof on the opposite side;
   a main valve 9 is arranged in said front chamber 6 and is constantly biased toward said valve seat 2 by a first spring 8;
   a substantially vessel-like sub-valve 11 is arranged in said rear chamber 7 and is constantly biased toward said spacer 5 by a second spring 10;
   a through-hole 13 is formed in said sub-valve 11 which includes a check valve 12;
   an end chamber 14 is defined between said main valve 9 and said valve seat 2;
   a side hole 16 extends through a sidewall 15 of said valve chamber 3, formed in said main body 1, so as to lead to said end chamber 14;
   an axial hole 18 extends through a front axial end wall 17 of said valve chamber 3 formed in said main body 1, so as to lead to said end chamber 14;
   a drain passage 20 formed in said main body 1, has an opening/closing valve 19 which allows said rear chamber 7 to communicate with an oil tank;
   a communication passage 21 is formed in said main body 1 and leads to said rear chamber 7;

a first passage 23 allows said communication passage 21 and said side hole 16 to communicate with each other and has a second check valve 22; and a second passage 25 allows said communication passage 21 and said axial hole 18 to communicate with each other and has a third check valve 24.

2. A valve according to claim 1, wherein a first passage 23 has a first pressure-compensating reducing valve 26, and said second passage 25 has a second pressure-compensating reducing valve 27.

3. A valve according to one of claim 2, wherein said drain passage 20 has an opening speed regulating valve 28, and said communication passage 21 has a closing speed regulating valve 29.

4. A valve according to claim 1, wherein said main valve 9 has a buffer member 30 which moves through said axial hole 18.

* * * * *